Aug. 25, 1925.  E. DUCHESNE  1,551,015
MILLING CUTTER
Filed Jan. 18, 1924   2 Sheets-Sheet 1
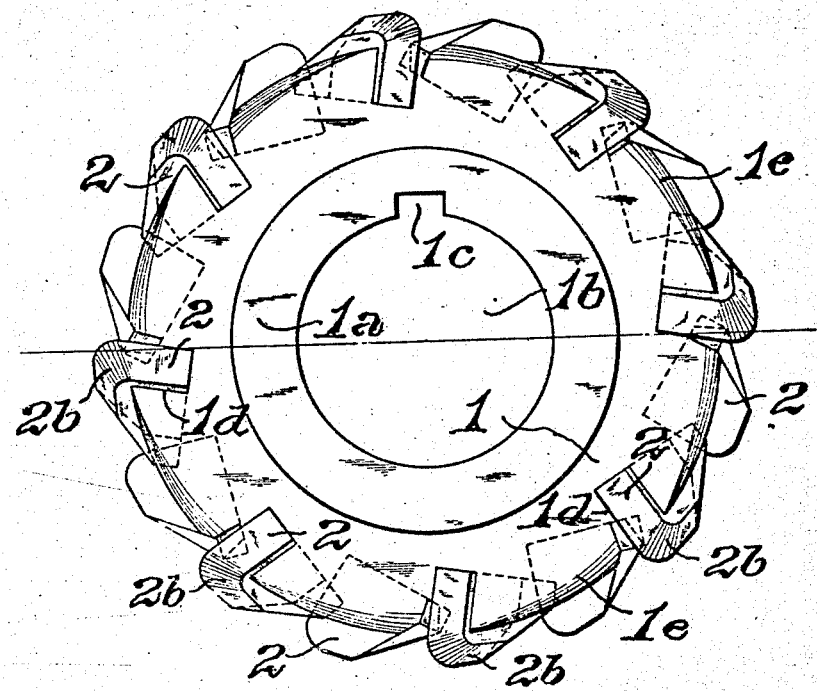
- FIG. 1 -
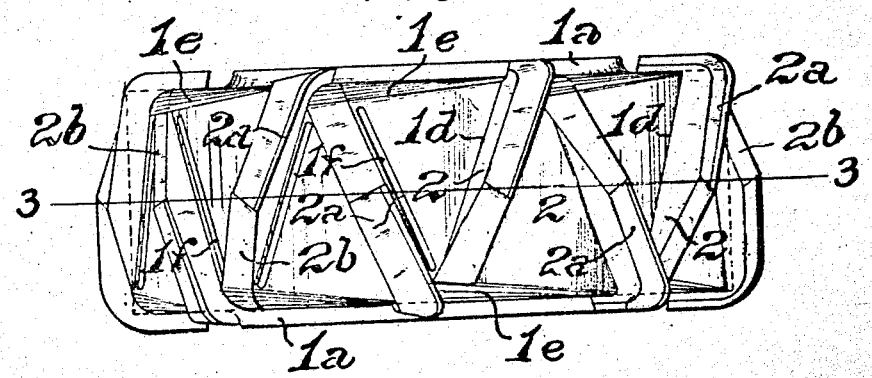
- FIG. 2 -
WITNESSES
A. S. Vanderbilt
S. R. Bell.
INVENTOR
Ernest Duchesne
by Howden Bell
Atty Aug. 25, 1925.  E. DUCHESNE  1,551,015
MILLING CUTTER
Filed Jan. 18, 1924    2 Sheets-Sheet 2
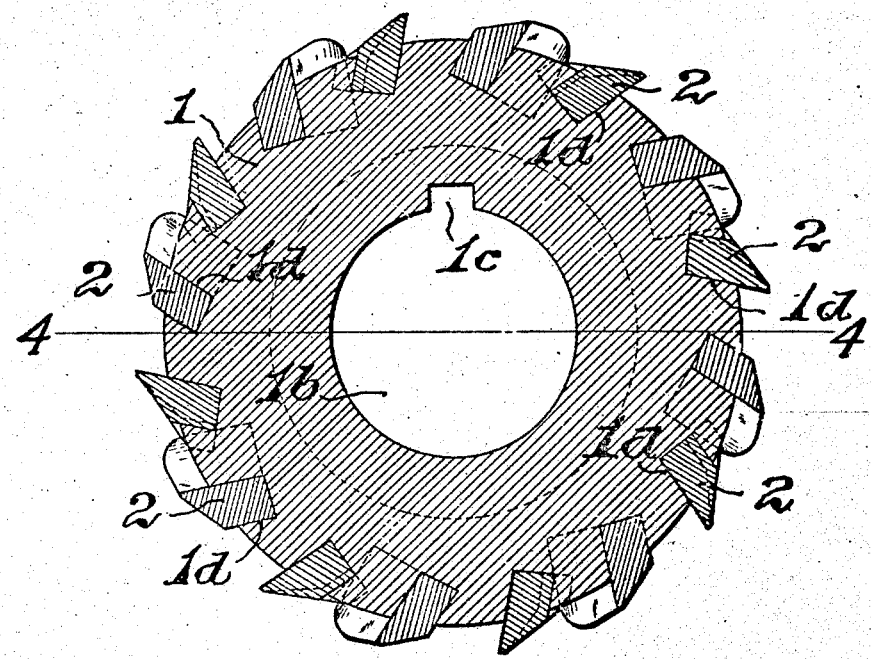
– FIG. 3 –
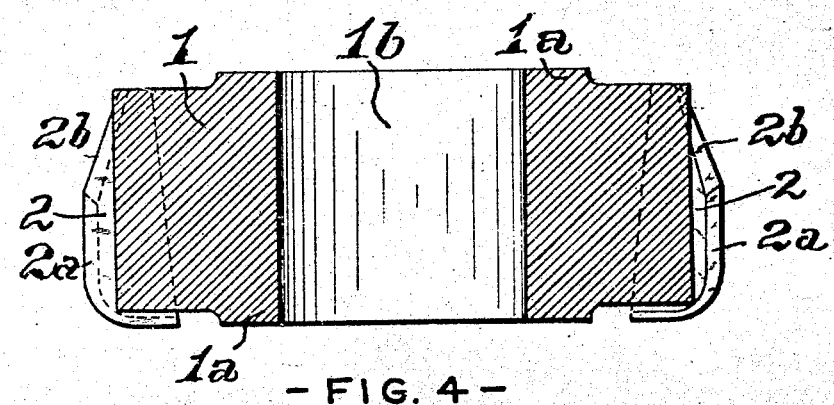
– FIG. 4 –

Patented Aug. 25, 1925.

1,551,015

UNITED STATES PATENT OFFICE.

ERNEST DUCHESNE, OF SCHENECTADY, NEW YORK.

MILLING CUTTER.

Application filed January 18, 1924. Serial No. 686,998.

*To all whom it may concern:*

Be it known that I, ERNEST DUCHESNE, of Schenectady, in the county of Schenectady and State of New York, have invented a certain new and useful Improvement in Milling Cutters, of which improvement the following is a specification.

The object of my invention is to provide a milling cutter which shall present the advantages of being much more readily machined, in manufacture, and of having longer blade fits than those of prior construction; affording maximum bearing for its blades on its body; and, which, in operation, will afford ample space for chip clearance and constitute a free working cutter.

The improvement claimed is hereinafter fully set forth.

In the accompanying drawings: Figure 1 is a side view, in elevation, of a milling cutter embodying my invention; Fig. 2, a face view of the same; Fig. 3, a section on the line 2—2 of Fig. 2; and Fig. 4, an axial section on line 4—4 of Fig. 3.

In the practice of my invention, referring descriptively to the specific embodiment thereof which is herein exemplified, the body, 1, of the cutter, is of cylindrical form, and of less diameter than the finished cutter, and is provided with bosses, $1^a$, on its sides, and with an axial bore, $1^b$, to fit on the arbor of the machine in which the cutter is to be operated, a key way, $1^c$, being cut in said bore.

A plurality of blade slots, $1^d$, is cut in the periphery of the body, extending entirely across it, said slots being inclined in alternately opposite directions, the opposite ends of each blade slot extending into the adjoining slots, as most clearly indicated in Fig. 2. The blade slots are also inclined at a proper cutting angle with the axial line of the body, and bevels, $1^e$, are cut in the edges of the body, in front of each blade slot to give maximum chip clearance, the bevels starting with a maximum depth just forward of each blade slot, and gradually tapering to zero depth at the back of the preceding blade slot.

A plurality of blades, 2, is fitted in the blade slots, each blade having one of its ends projecting beyond one of the sides or diametral faces of the body, and having a cutting lip, $2^a$, extending from said end, slightly beyond the middle diametral plane of the body. The blades are bevelled from the inner ends of their cutting lips, for the remainder of their length to the adjacent side of the body, their bevelled faces, $2^b$, being shown in Figs. 1 and 2. The back end of each blade abuts against the front face of the following blade, thereby locking the blades against lateral movement when cutting in service. This manner of locking the blades differs substantially from that ordinarily practiced in cutters of the general type to which my invention relates, in which the blade slots are cut only part way across the body, and the blades are caused to abut against the inner or blind ends of the slots. Caulking grooves, $1^f$, are formed in the body, 1, adjacent to the blade slots, for enabling the blades to be tightened therein.

The bevelling of the rear portions of the blades eliminates all possibility of making a dragging cut, as both the front side and the top of the cutting portion of the blade retain a positive cutting angle, whereas when the cutting edge of the blade is made continuous across the body, as in prior practice, the cutting angle at the base becomes excessive, and the rear side cutting lip drags.

It will be obvious to those skilled in the art, that the provision of straight blade slots, extending continuously across the periphery of the body, greatly facilitates the machining of the body; that the abutting relation of the blades effectually locks them against lateral movement; and that longer blade fits are practicable than in cutters of the ordinary construction, by reason of the extension of the blades entirely across the body. The bevelling of the rear ends of the blades and the edges of the body, affords ample space for chip clearance and ensures a freely working cutter, and the tapering to the zero recess, of the body bevels, at the rear of the blade slots, affords a maximum extent of bearing for the blade in the face of the body.

I claim as my invention and desire to secure by Letters Patent:

1. In a milling cutter, the combination of a body, having a plurality of inclined blade slots extending across its periphery, and having its edges gradually relieved radially from a maximum depth at one blade slot to a zero depth at the next succeeding slot; and a plurality of cutting blades, fitted in said slots, each of said blades abutting against a following blade.

2. In a milling cutter, the combination of a body having a plurality of alternately reversely inclined blade slots extending entirely across the periphery of the body, each slot merging at its ends into the ends of the two adjoining slots, and the edges of the body being beveled in front of each slot to provide chip clearance, and a blade fitted in each slot with one end projecting beyond the end of the slot, and having a cutting lip extending from said projecting end to a point slightly beyond the central longitudinal plane of the body.

3. In a milling cutter, the combination of a body, having a plurality of inclined blade slots extending across its periphery; and a plurality of cutting blades, fitted in said slots, each of said blades abutting against a following blade, and having a cutting lip extending partly across the body, and a bevelled face extending therefrom to one side of the body.

ERNEST DUCHESNE.